H. H. & J. E. FEFEL.
BLINDSTITCH SEWING MACHINE.
APPLICATION FILED MAY 17, 1904.

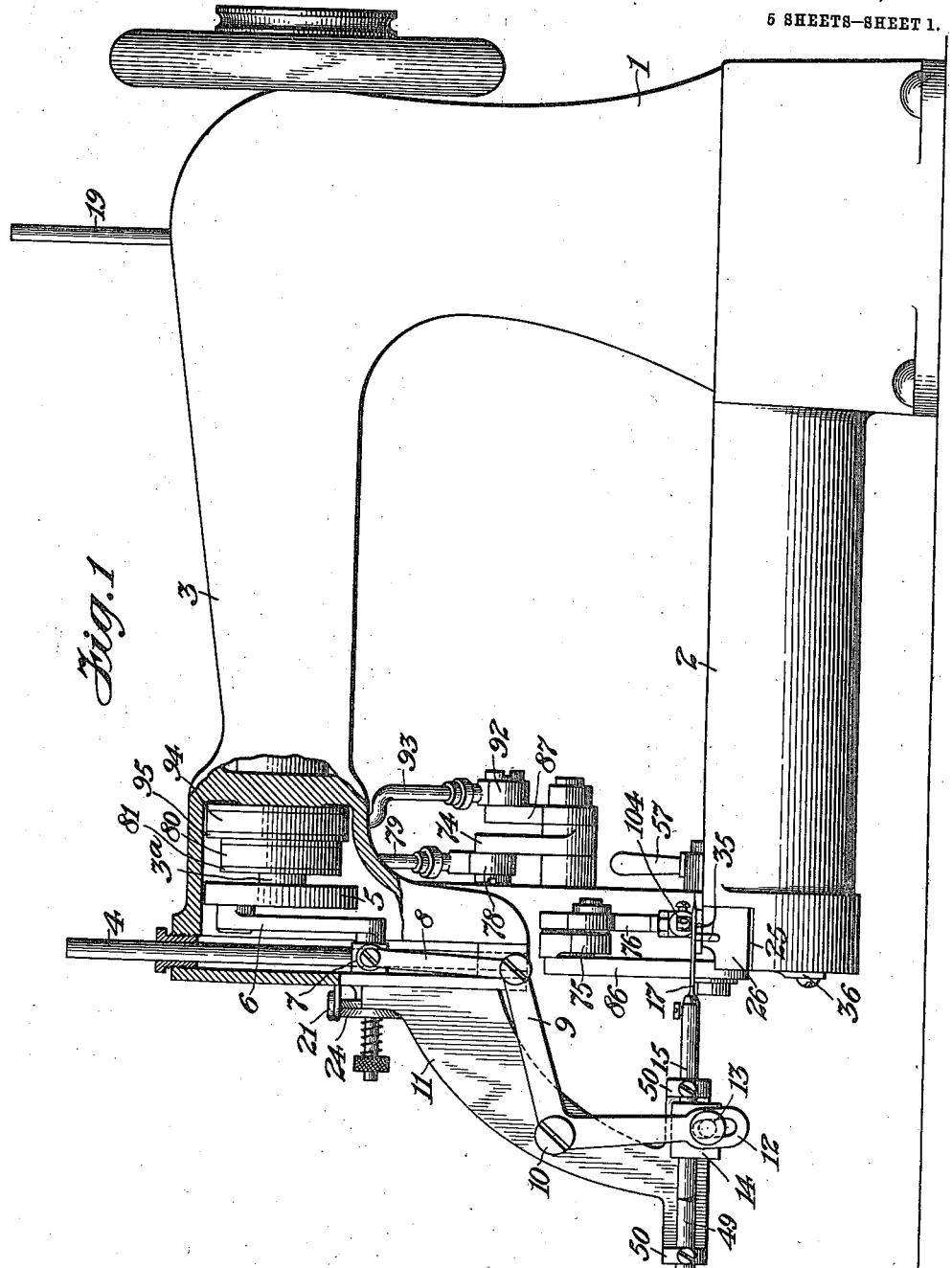

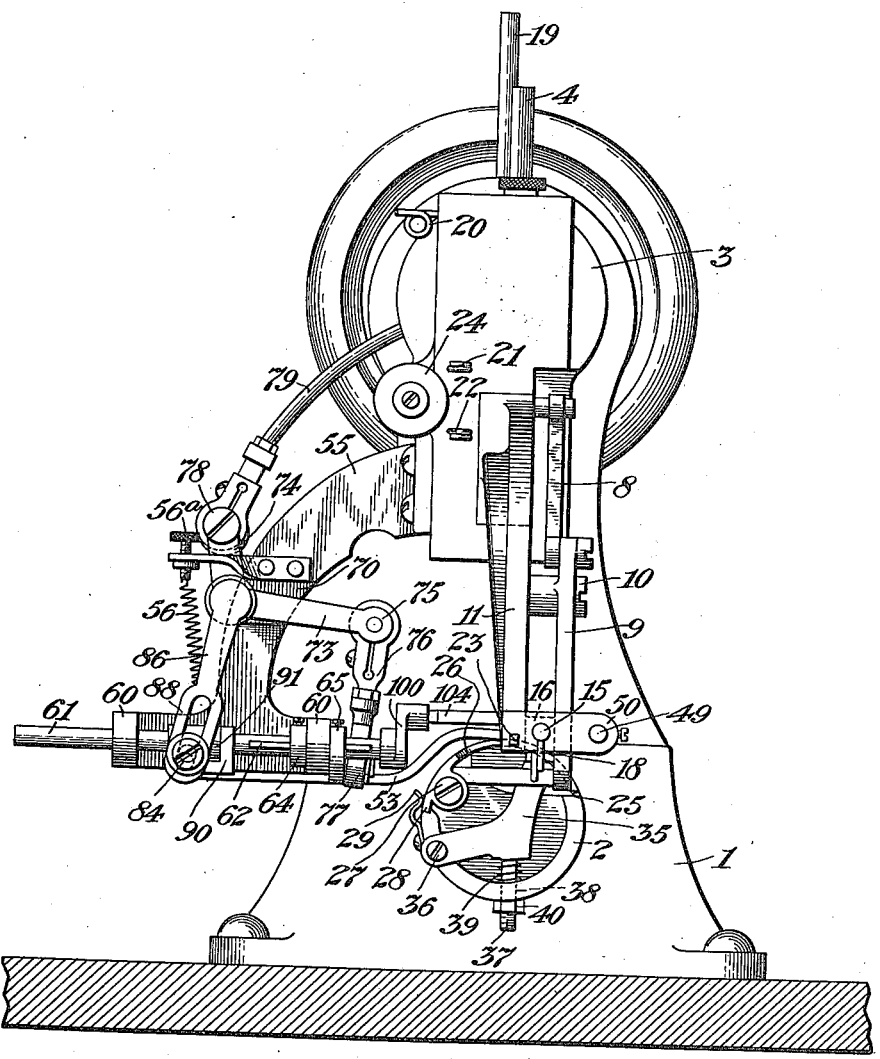

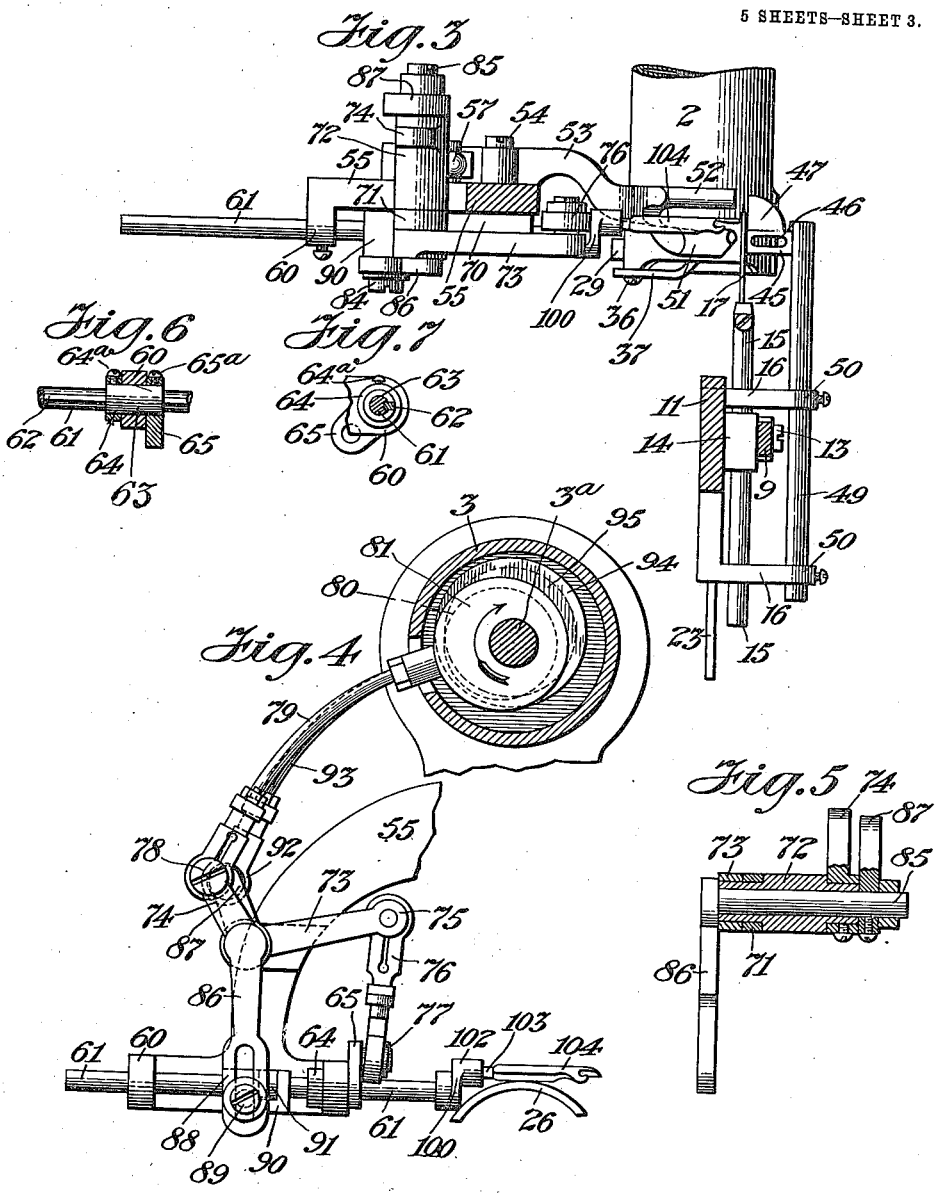

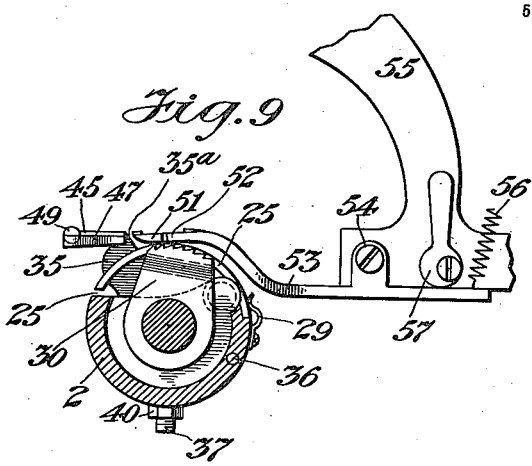
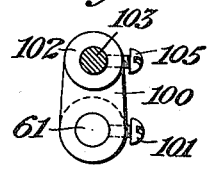
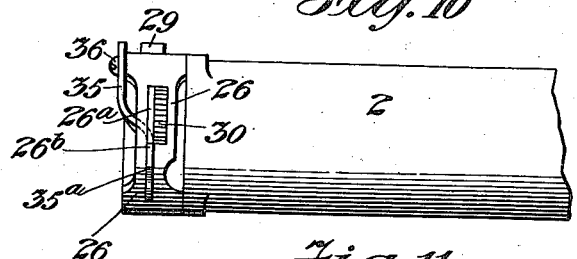
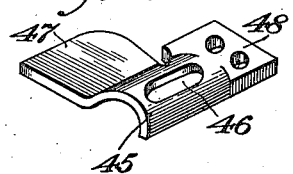
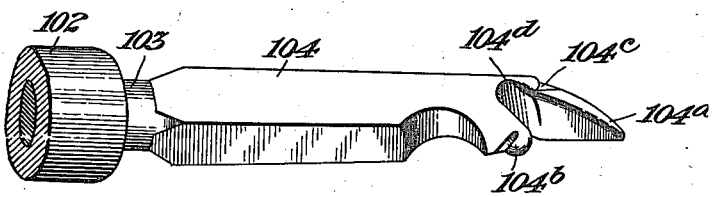

976,256.

Patented Nov. 22, 1910.
5 SHEETS—SHEET 5.

Witnesses
M. Herskovitz
Grace ...

Inventors:
Henry H. Fefel and John E. Fefel.
By Chas. M. C. Chapman, Asso. Atty.

ns and mechanisms hereinafter described
UNITED STATES PATENT OFFICE.

HENRY H. FEFEL AND JOHN E. FEFEL, OF NEW YORK, N. Y., ASSIGNORS TO WM. D. ELGER, OF NEW YORK, N. Y.

BLINDSTITCH SEWING-MACHINE.

976,256.

Specification of Letters Patent.  Patented Nov. 22, 1910.

Application filed May 17, 1904.  Serial No. 208,350.

*To all whom it may concern:*

Be it known that we, HENRY H. FEFEL and JOHN E. FEFEL, of New York, in the county of New York and State of New York, have invented certain new and useful Improvements in Blindstitch Sewing-Machines, of which the following is a specification.

Our invention relates to sewing-machines, and particularly to the type of sewing-machines capable of making blind-stitch seams.

An object of our invention is to provide a sewing-machine capable of making an overedge blind-stitch.

Another object is to provide a blind-stitch sewing-machine by means of which blind-stitching can be done upon all kinds of goods or fabric, including the finest as well as the heaviest.

Another object of our invention is to provide a blind-stitch sewing-machine by means of which the blind-stitch can be placed in work of varying thicknesses without any alteration, modification or adjustment of the parts.

Other objects of our invention are involved in the production of an improved stitch-forming mechanism, and an improved cloth or work-controlling and manipulating device.

Other incidental objects will be set forth during the course of this description, and with them all in view our invention consists in the parts, features, combinations of elements and mechanisms hereinafter described and claimed.

Figure 17:
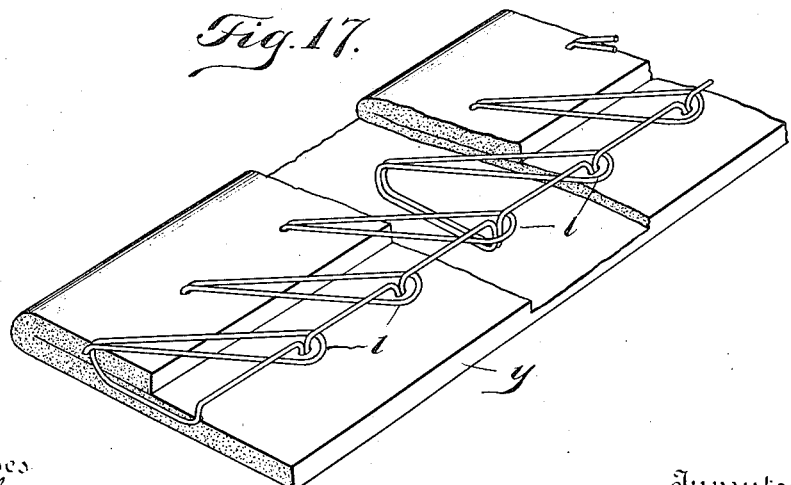

In the drawings, Figure 1 is a front elevation of our improved sewing-machine, parts of the frame thereof being broken away in order to show the driving or actuating mechanism; Fig. 2 is an end elevation of the machine of Fig. 1; Fig. 3 is a horizontal sectional view taken in a plane just above the stitch-forming mechanism; Fig. 4 is a vertical sectional view taken just in advance of the looper actuating eccentrics and showing the looper mechanism in elevation; Fig. 5 is a sectional view showing a detail of the looper actuating mechanism; Figs. 6 and 7 are detail views illustrating the adjustable spline connection of the rocking-arm with the looper-rod; Fig. 8 is a detail front elevation of the adjustable looper-supporting crank-arm; Fig. 9 is a detail sectional view illustrating the divided presser-foot mechanism, the yielding throat-plate, and the feed-dog; Fig. 10 is a plan view of a portion of the work-supporting arm, showing the throat-plate and adjacent parts; Fig. 11 is a perspective view of the rigid portion of the divided presser-foot mechanism; Fig. 12 is an enlarged detail perspective view of the looper, its supporting crank being in section; Figs. 13, 14, 15, and 16 are diagrammatic views illustrating four successive steps in the formation of a stitch in our machine; Fig. 17 is a perspective view of the work and stitch, a strip of the work being shown, and a section of the strip being removed in order to show clearly the run of the thread for making the blind chain-stitch, according to our invention.

Primarily, it should be understood that our machine makes a blind, overedge chain-stitch, and manipulates the work in such manner that the needle is enabled to enter and emerge from the work on the same side, and thus passes its thread through the work so that it will not show on the other side. This is highly essential in connection with light and thin goods wherein seams have to be sewed and hems have to be turned and stitched to the body fabric without having the thread show on the face thereof; and in this connection it has been found difficult to sew, with a blind-stitch, varying thicknesses of work, such as may occur at cross-seams, owing to the fact that it is difficult to present the work to the stitch-forming mechanism in such manner that the needle will invariably engage the work at the same distance from the side on which the stitches are being laid. Our invention obviates all the difficulties in this connection, enables the stitch-forming mechanism to apply the stitch uniformly to the work regardless of varying thicknesses of the latter which may pass through the machine, and hence enables our machine to work on thin fabrics, sew the hems at the bottom of trousers and accomplish other work of like difficult character.

The sewing-machine head 1 has a horizontally extending cylindrical work-supporting horn 2 and an overhanging arm 3. Suitably mounted in the arm 3 is the main shaft $3^a$ for actuating the needle and looper mechanisms presently to be explained.

4 is a vertically reciprocating needle-bar operating rod, working in bearings in the arm 3 and actuated by a crank-disk 5 secured to the main-shaft of the machine, and connected by link 6 with a block 7 adjustably secured to the rod 4. A link 8 is pivoted to the block 7, and to one arm of a bell-crank lever 9 journaled at 10 upon the bracket 11 rigidly secured to and projecting from the head of the arm 3. The other arm of this bell-crank lever 9 is formed with a slotted end 12 which engages a pin or screw 13 seated in a block 14 adjustably secured to the horizontally reciprocating needle-bar 15 which is journaled in bearings 16 of the auxiliary bracket 11. The needle-bar 15 carries at its inner end a needle 17 which may be of the ordinary eye-pointed character. A thread-guide 18 is mounted upon the outer end of the needle-bar 15.

19 is the spool supporting rod.

20, 21, 22 and 23, see Fig. 2, are needle-guides, and 24 is a tension device. The thread passes from the spool, through said needle-guides and tension device to the needle, in the usual manner.

The upper face of the work-supporting horn 2, at its outer end, is cut away at 25 to receive a curved throat-plate or work-support 26, which is journaled or pivoted at 27 to the end of the horn 2, the heel or portion 28, being engaged by a leaf-spring 29 for yieldingly supporting the throat-plate or work-support in normal operative position. The throat-plate 26 is slotted at 26ª to allow the serrated feed-dog 30 to project up into engagement with the under surface of the cloth which is to be operated upon and fed over the horn. This feed-dog 30 may be of any suitable construction and is not shown in detail in the accompanying drawings, and it being only essential that the feed be of the type which has a forward feeding motion in engagement with the cloth and a return or inoperative motion disengaged from the cloth, being thus of the four-motion type. The throat-plate 26 is also formed with a narrow slot 26ᵇ extending forwardly from and in continuation of the main slot 26ª, and projecting up through this slot 26ᵇ is the ridge or fold-forming rib 35, which is of the angular shape shown in Fig. 2, is pivoted upon the work-supporting horn at 36, is formed with a downwardly projecting stem 37 which extends through a guide opening 38 in the horn, is surrounded by a sustaining spring 39, and is held in the desired adjusted position by means of a nut 40 threaded upon its lower projecting end. The upper active portion or nose 35ª of the rib 35 is arranged to rest, normally, directly beneath the path of reciprocation of the needle so as to effectively support a ridge or fold of the material in the path of movement of the needle.

The presser-foot mechanism comprises two principal parts which are separated in the vertical plane of the path of the needle. The forward, or front, portion consists of a plate having an upwardly curved portion 45 formed with an elongated slot 46 and a laterally projecting wing 47. The plate is also formed with a flange 48, by which it may be secured to a rod 49, adjustably mounted in the bearings 50, of the bracket 11, which bearings are formed in extension of the needle-bar bearings. By this means the curved, or grooved, portion 45 is supported directly over the rib 35, and has the function of forcing and confining the work upon the rib, which, in turn, bows the work vertically. Thus coöperating, the rib 35ª and grooved portion 45 of the plate form a fold in the work and present the latter to the needle so that it will enter the work and emerge therefrom on the same side and without penetrating to the other side, thus enabling a blind-stitch to be formed, or one whereof the strands, threads or loops appear on but one side of the work. By thus supporting, manipulating and presenting the work, the needle is caused to enter the latter and emerge therefrom always at a uniform distance from the surface; and by rendering the rib adjustable, as described, the fold and the presentation thereof to the needle can be regulated. Moreover, by making the grooved plate adjustable,—viz., in the direction of the length of its supporting rod 49 and around the axis of the latter,—it can be properly positioned relatively to, or centered and alined with, the rib 35ª, and its front portion adjusted relatively to the rib so as to properly confine the work on the latter irrespective of its thickness. The wing 47, of the plate, confines the work on the right of the line of stitching and thus properly controls the work during its passage, or while it is being fed, over the work-supporting horn. Furthermore, and in conjunction with the rib and plate to perform the described functions, the operation of the spring-controlled throat-plate, or work-support, is important; for, irrespective of the kind of work being operated upon, varying thicknesses are often presented to the needle, such as in cross-seams, or hemmed-work. Hence, to enable the needle to always enter and emerge from the work at a uniform distance from the surface, it is necessary to limit the extent to which the work may be moved relatively to the working plane of the needle. The plate, with its grooved portion 45, constitutes the means according to the adjustment of its front end, for limiting, or regulating, the position of the work relatively to the plane, or path, of reciprocation of the needle; and, should a cross-seam, or other thickened portion, of the work, present itself for passage between the plate and rib, the latter and the throat-plate will readily yield, or be depressed, to the desired extent for the easy passage of the work, but without losing their control of the work,— the rib for holding the latter properly against the grooved portion of the plate for engagement of the needle, and the throat-plate for properly supporting the work at the end of the horn. Thus, the work can always pass freely over the horn, will never crowd at or about the stitching point nor drag on the feed-dog, and will always be presented properly and uniformly to the stitch-forming mechanism. The elongated slot 46, provides a sight-hole for viewing and watching the work and enables the various adjustments to be made accurately and with great facility.

The rear portion of the presser-foot mechanism consists of a lever 53, formed, at one end, with a bifurcated plate, one arm 51 of which extends above the throat-plate and substantially in line with the curved portion 45 of the other presser-plate, while the other arm 52 extends at one side over the horn 2 and substantially in line with the wing 47 on the right of the line of stitching. The bifurcated plate is formed on, or integral with, the lever 53 and is vertically off-set therefrom by a curved portion, as shown in Fig. 9. The lever is pivoted on the bracket 55, extending from the rear of the head of the overhanging arm 3, and thus extending at substantially a right-angle to the bracket 11 which supports the needle-bar and the other portion of the presser-foot mechanism.

The pin or screw 54 mounted in the bracket 55 forms the pivotal support for lever 53; and a spring 56 connects the rear end of the lever 53 with an adjustable screw 56ª, see Fig. 2, for the purpose of giving the presser-plate 51—52 a yielding downward pressure. A cam-lever 57 is journaled upon the bracket 55 in position to engage the rear end of the lever 53, so as to raise the presser-plate 51—52 from the material when it is desired to insert or remove work. It will now be seen that this portion of the presser-foot mechanism is formed and disposed to have the following functions: The lever 53 is so mounted and disposed that its presser-plate may be lifted bodily the necessary distance for the insertion and removal of the work, by turning the cam-lever 57; and when said plate is in contact with the work, it yieldingly holds the same against the throat-plate, horn, and feed-dog, which latter is thus enabled to engage and feed the work over the horn and rib. Obviously, as varying thicknesses of work pass between the feed-dog and plate 51—52, the latter will yield and yet properly hold the work in contact with the dog for feeding purposes. The adjustment of the screw 56ª will regulate the pressure of the plate upon the work. The arm 51 is so disposed that it, directly, coöperates with the feed and, being in line in the direction of feed, with the rib and grooved plate, holds the work down in proper condition, as it leaves the rib and groove for the engagement of the needle and coöperation of the looper, the said arm 51, see Fig. 3, being extended to nearly the working path of the needle for the purpose. The arm 52, coöperates with the wing 47, being substantially in alinement therewith, in confining and controlling the work on the right of the line of stitching while said work is being fed over the horn. And the slot, between the two arms 51 and 52, is formed so as to afford room for the operation of the looper which, in its forward stroke, must move close enough to the presser-plate to coöperate with the needle and take a loop therefrom.

The bracket 55 is formed with the laterally projecting perforated bearings 60 in which is mounted the looper-rod 61. This rod is formed for a portion of its length, see Figs. 2 and 6, with a longitudinally extending spline 62 with which engages the longitudinally split-sleeve 63, see Figs. 6 and 7, adjustably confined in the forward one of the bearings 60, by means of a collar 64 and the hub of a crank-arm 65 both of which are clamped to said sleeve 63. The split-sleeve 63 also affords a bushing for said bearing 60 and is oscillated therein by the crank-arm 65 to cause the looper-rod 61 to oscillate. The collar 64 has a set-screw 64ª passing therethrough and which engages the split-sleeve 63 for adjusting it longitudinally upon the splined portion of the looper-rod 61; and the hub of the crank-arm 65 is provided with a similar set-screw 65ª passing therethrough for engaging the split-sleeve 63 for the same purpose and for properly locating said crank-arm. Obviously, this connection permits the looper-rod to have longitudinal movement in its bearings and affords a strong and compact means for rocking the same. A bracket-arm 70, see Fig. 2, projecting from the bracket 55 has a bearing 71 in which is journaled a rocking sleeve, or short, tubular shaft 72, see Fig. 5, to one end of which is keyed a rock-arm 73, and to the other end of which is keyed a rock-arm 74, these two arms extending at substantially a right-angle to each other. The rock-arm 73 has universal joint connection 75 with the upper end of a link or pitman 76, which at its other end, has universal joint connection 77 with the crank-arm 65. The rock-arm 74 is connected at 78 with an eccentric strap 79, the ring 80 of which encircles the eccentric 81 on the main-shaft. 85 is a short rock-shaft freely journaled in the rocking sleeve 72 and having keyed to its opposite ends the rock-arms 86 and 87 which extend at an angle to each other. The rock-arm 86 has a slotted lower end 88 in which slot engages a pin or screw 89 carried by a yoke 90 which is freely journaled upon the looper-rod 61 and is confined from longitudinal movement thereon by means of a collar 91 secured to the looper-rod between the arms of the yoke. The rock-arm 87 is connected at 92 with an eccentric strap 93, the ring 94 of which encircles the eccentric 95 on the main-shaft. At the forward end of the looper-rod 61 is adjustably mounted a crank-arm 100, see Fig. 8, by means of a set-screw 101, the crank-arm being formed at one end with a socket which fits the forward end of the looper-rod. This crank-arm 100 is also formed at its other end with a socket 102 in which the shank or stem 103 of the looper 104 is adjustably secured by means of a set-screw 105. The looper body 104 is formed, at its forward end, into the extended loop-engaging prong 104$^a$, a short loop-spreading finger or heel 104$^b$ and a needle receiving and guiding groove or throat 104$^d$. The loop-engaging prong is given the proper form by tapering or inclining its top edge from the plane of the top of the looper body to the plane of the bottom of said body, thus producing an acute-angle the vertex of which lies in the plane of the bottom of the looper and constitutes the loop-engaging point. The back of the prong 104$^a$ is also rounded or given a slight curve toward its face, or left side, which latter is also slightly curved or hollowed, thus giving the loop-taking prong substantially a wedge form to properly expand the needle-loop. By properly scoring the top edge of the prong 104$^a$, near the throat 104$^d$, a thread-retaining notch or shoulder 104$^c$ is formed; and a notch for a similar purpose is formed in the heel or finger 104$^b$.

It will now be seen that we have provided a looper capable of properly coöperating with the needle and with the presser-foot mechanism, in a manner to perform the several important functions presently to be noted; that the looper can be adjusted axially and longitudinally in its crank-arm 100, to accurately position its loop-engaging prong relatively to the needle; that the crank-arm 100 can be adjusted on the looper-rod 61, circumferentially and longitudinally, to enable said arm to be properly disposed so as not to interfere with adjacent parts of the machine during the rocking and reciprocating movements of said rod, and also to regulate the extent of the forward projection of the looper and the zone of its rocking movement; that the looper actuating mechanism is driven from the forward end of the main-shaft by two simple and smoothly acting eccentrics which impart the requisite movements without noise or jar; that the looper-actuating mechanism consists of a simple, short, compact and noiseless train of elements, the movements of which are short and produce little or no vibration of the machine frame.

The general operation of the machine will now be clear with the following description: The rotation of the main-shaft will cause the feed-dog, in the forward end of the horn 2, to have the usual four motions to engage feed and release the work and return to starting position; and will also reciprocate a needle-bar longitudinally of the horn 2, and at a right-angle to the direction of feed and path of reciprocation of the looper by means of the crank-disk, links 6 and 8, and bell-crank 9. The eccentric 95 actuates the strap 93, which rocks the short arm 85, by arm 87, the shaft in turn rocking arm 86, which imparts longitudinal movements to the looper-rod and looper; and the eccentric 81 actuates the strap 79, which rocks the tubular shaft 72, by arm 74, the tubular shaft in turn rocking arm 73, which imparts, through the pitman 76, rocking movement to the arm 65, connected to the split collar 63, which engages the spline 62 and thus rocks the looper-rod and looper. The rocking movements of the looper are so timed with its reciprocating movements, and the movements of the looper are so timed with the movements of the needle as to produce the blind, overedge, chain-stitch shown in Fig. 17, which will be readily understood on reference to Figs. 13 to 16, which show, e. g. the application of the stitch to a piece of hemmed work. It will be remembered that, to insert the work in the machine, the presser-plate 51—52 is elevated by turning the lever 57 and depressing the rear end of the lever 53; then the work is inserted between the rib 35 and the grooved presser-plate 45, the two readily forming the fold or ridge in the work and holding the same in the proper plane for the action of the needle. The needle and looper will be at substantially their rear extreme, and the looper will lie with the bottom of its prong 104$^a$ close to the arms 51 and 52, and practically in the slot between the same, it being understood that the looper, in its forward movement, travels in a plane or path which carries its flat bottom over and just clear of the needle.

Figure 13:
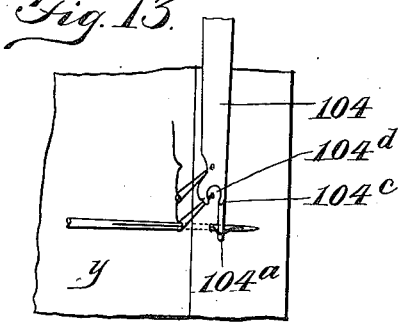
Figure 14:
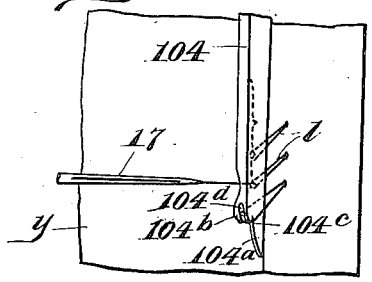
Figure 15:
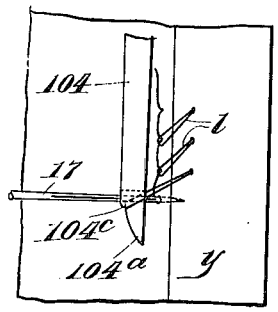
Figure 16:
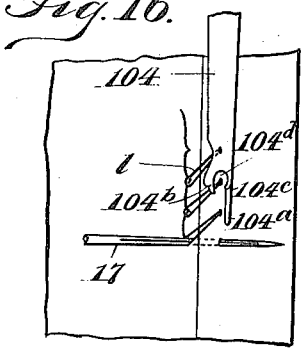

Referring, now, to Fig. 13 it will be seen that,—the machine being in operation,—the needle advances and enters the single thickness of the work y, at the fold or ridge and emerges on the same side of the work in the hem, carrying its thread sufficiently far to cause the same to bow or throw out a loop as the needle returns, the looper in the meantime advancing in a path on the right of the line of seam and its prong entering the loop 1, thrown out by the needle, thus preventing said loop from being withdrawn by the latter. After the prong of the looper has entered the loop, the needle recedes from the work and the looper continues its forward movement and passes into the loop until the latter enters the notch 104$^c$ where it will be retained for a period and the looper thus elongating the loop as shown in Fig. 14. As the looper reaches its forward extreme, it is given a movement, around its axis, which causes the same to carry the loop over the line of seam and assume in transit the position of Fig. 14. The loop being thus elongated, also becomes spread, or enlarged, by the turning of the looper around its axis so that the lower strand of the loop is placed in position to be engaged by the spreading finger 104$^b$. On the continued circular movement of the looper, the finger engages said strand, see Fig. 14, which latter slips into the notch thereof, the strand being thus depressed below the path of the needle and the loop expanded for the entrance of the needle. The looper completes its turning movement and begins to move rearwardly, the feed taking place at substantially the same time and carrying the angle of the loop in the line of the seam so as to retain the loop in the notch 104$^c$ of the looper and so that the loop may be properly presented to the needle, as the same again advances, said needle entering said loop from the top, as shown in Fig. 15, and passing through the throat 104$^d$ of the looper. The looper, continuing its backward movement, recedes from the loop and leaves it upon the shank of the needle, the latter continuing its forward movement and passing through the work and throwing out another loop as before, see Fig. 16. The looper, meantime, has reached its rear extreme, rocked back over the line of seam, and again advances as in Fig. 13, the previous operations continuing in the order described and producing the seam of Fig. 17.

It will thus be seen that we have produced a blind-stitch machine which is simple in its parts and operation, is compact and capable of attaining high speed, will operate equally well upon thick and thin materials without laborious or extensive adjustments, will automatically adapt itself to varying thicknesses of work, and can be adjusted to such a nicety in all its parts as to enable it to operate upon the thinnest and most delicate fabrics without skipping stitches.

Having thus described our invention, what we claim and desire to secure by Letters Patent is:

1. A blind-stitch sewing machine comprising a work-supporting horn and a hollow overhanging arm; a feeding mechanism for traversing the work transversely over the horn; stitch-forming mechanism, carried by the arm, including a needle reciprocating lengthwise of the horn and a looper reciprocating transversely and oscillating longitudinally of the horn; a driving-shaft journaled in the hollow arm; eccentrics carried by the forward end of said shaft within the arm; and connecting means from the eccentrics to, and for actuating, the stitch-forming mechanism.

2. A blind-stitch sewing machine comprising a work-supporting horn and a hollow overhanging arm; means for feeding the work transversely over the horn; stitch-forming mechanism, carried by the arm, including a needle reciprocating lengthwise of the horn and a looper reciprocating transversely and oscillating longitudinally of the horn; means for forming the work into a ridge or fold at the stitch-making point; a driving-shaft journaled in the hollow arm; eccentrics carried by the forward end of said shaft within the arm; and connecting means from the eccentrics to, and for actuating, the stitch-forming mechanism.

3. A blind-stitch sewing machine comprising a work-supporting horn and a hollow overhanging arm; means for feeding the work transversely over the horn; stitch-forming mechanism, carried by the arm, including a needle reciprocating at an angle to the line of feed and a looper reciprocating transversely and oscillating longitudinally of the horn; means carried by the horn for forming the work into a ridge or fold at the stitch-making point, a driving-shaft journaled in the hollow arm; eccentrics carried by the forward end of said shaft within the arm; and connecting means from the eccentrics to, and for actuating, the stitch-forming mechanism.

4. A blind-stitch sewing machine comprising a rigidly held work-support; a feeding mechanism; a yielding ridge-forming device carried by the work-support, and the latter having its upper surface curved in the direction of feed; and stitch-forming mechanism including a looper, supported so as to reciprocate substantially parallel to the line of feed, and a needle, supported to reciprocate in a right-line lengthwise of the support; means for reciprocating said looper parallel with the ridge-forming device and rocking the same over the ridge-forming device and the work-support; and means for actuating the needle.

5. A blind-stitch sewing machine comprising stitch-forming and feeding mechanisms; a work-support in which the feeding mechanism works and an overhanging arm by which the stitch-forming mechanism is supported; the stitch-forming mechanism comprising a longitudinally reciprocating and rocking looper disposed transversely of the work-support; and a needle reciprocating longitudinally of said support; and means for actuating the looper and needle, the looper-actuating mechanism including two rotating eccentrics and connecting mechanisms between the same and the looper.

6. A blind-stitch sewing machine comprising a stitch-forming and feeding mechanism; a work-support in which the feed works and an overhanging arm which supports the stitch-forming mechanism with the looper thereof extending transversely of the work-support and the needle longitudinally of the latter; means for actuating the stitch-forming mechanism comprising two rotating eccentrics and connecting mechanisms from the eccentrics to the looper of the stitch-forming mechanism, said connecting mechanisms each including a two-armed rock-shaft.

7. A blind-stitch sewing machine comprising stitch-forming and feeding mechanisms; a presser-foot mechanism comprising a fixed grooved plate, and a yielding bifurcated plate for controlling the work on opposite sides of the line of stitching; and a ridge-forming device coöperating with the fixed plate.

8. A blind-stitch sewing machine comprising stitch-forming and feeding mechanisms; a presser-foot mechanism comprising a fixed grooved plate and a yielding bifurcated plate; and a yielding ridge-forming device coöperating with the fixed plate.

9. A blind-stitch sewing machine comprising stitch-forming and feeding mechanisms; a presser-foot mechanism comprising a fixed plate and a yielding plate; a ridge-forming device coöperating with the fixed plate; and means for adjusting the fixed plate relatively to the said device.

10. A blind-stitch sewing machine comprising stitch-forming and feeding mechanisms; a rigid work-support; and yielding mechanism, carried by said support, for forming the work into a ridge for presentation to the stitch-forming mechanism, including means for locating the ridge in the work and controlling the position thereof.

11. A blind-stitch sewing machine comprising stitch-forming and feeding mechanisms; a rigid work-support; and mechanism, carried by said support, for forming the work into a ridge for presentation to the stitch-forming mechanism, including a fixed member and a yielding member, and means for locating the ridge in the work and controlling the position thereof.

12. A blind-stitch sewing machine comprising stitch-forming and feeding mechanisms; and work-controlling mechanism, including a ridge - forming device, a rigid work - support and a yielding throat - plate carried by the latter.

13. A blind-stitch sewing machine comprising stitch-forming and feeding mechanisms; and work-controlling mechanism, including a ridge - forming device, a rigid work-support, a yielding throat-plate carried by the latter, and a yielding presser-plate.

14. A blind-stitch sewing machine comprising stitch-forming and feeding mechanisms; and work-controlling mechanism, including an adjustable ridge-forming device, a rigid work-support, a yielding throat-plate carried by the latter, and a yielding presser-plate.

15. A blind-stitch sewing machine comprising stitch-forming and feeding mechanisms; and work-controlling mechanism, including a ridge-forming device having a fixed part and a yielding part, means for adjusting the fixed part, and means for adjusting the yielding part.

16. A blind-stitch sewing machine comprising stitch-forming and feeding mechanisms; and a presser-foot mechanism comprising two independently mounted plates; and means for adjusting one of the plates in a direction at an angle to the other for mutual coöperation to manipulate the work during stitching.

17. A blind-stitch sewing machine comprising stitch-forming and feeding mechanisms; and a presser-foot mechanism comprising two independently mounted plates; and means whereby one of said plates may be adjusted in two different angular directions relatively to the other for mutual coöperation to manipulate the work during stitching.

18. A blind-stitch sewing machine comprising stitch-forming and feeding mechanisms; and a presser-foot mechanism comprising a pivoted plate and a fixed plate independently mounted; means for rendering the pivoted plate yielding in its action; and means for adjusting the fixed plate.

19. A blind-stitch sewing machine comprising stitch-forming and feeding mechanisms; a work-support; and a presser-foot mechanism comprising a fixed plate having a work-confining wing, and a yielding plate having a work-confining portion coöperating with the wing, whereby the bulk of the work is properly controlled on one side of the line of stitching during the feeding of the same over the work-support.

20. A blind-stitch sewing machine comprising a work-support; a feeding mechanism; stitch - forming mechanism; and a presser-foot mechanism, comprising a fixed part and a yielding part both the parts having portions controlling the work on opposite sides of the line of seam; means for adjusting the fixed part; and means for controlling the pressure of the yielding part.

21. In a sewing machine, the combination of a work-supporting horn, feed mechanism carried thereby, suitable stitch - forming mechanism, and a presser-foot mechanism comprising the rigidly mounted presser-plate 45, 47 and a yieldingly mounted presser-plate 51, 52, said presser-plates being separated in the path of the needle, substantially as set forth.

22. In a sewing-machine, the combination of a work-supporting horn, suitable feed mechanism, a needle operating transversely to the line of feed, a looper coöperating with the needle, a rigid presser-plate 45, 47, an adjustable bar 49 upon which said plate is mounted, bracket arms supporting said bar, means for clamping the bar in said bracket arms, a yieldingly mounted presser-plate 51, 52 mounted upon a pivotally supported arm 53, and a spring holding said presser-plate 51, 52 in engagement with the cloth upon the work-supporting horn, substantially as set forth.

23. In a sewing machine, the combination of a work-supporting horn, having a cut-out portion 25, a curved throat-plate 26 supported in said cut-out portion and journaled at 27, a leaf-spring 28 engaging the throat-plate for yieldingly supporting it in normal position, a presser-foot mechanism, and stitch-forming and feeding mechanisms, substantially as set forth.

24. In a sewing machine, the combination of a work-supporting horn, with a slotted throat-plate, a pivotally mounted ridge-forming member 35 having a depending stem 37, a guide opening in which said stem operates, an adjustable nut working upon said stem for regulating the amount of projection of the ridge-forming member above the throat-plate, a spring holding said ridge-forming member in its normal position, and suitable stitch-forming and feeding mechanisms, substantially as set forth.

25. In a sewing machine, the combination of suitable feeding mechanism, and a needle reciprocating transversely to the line of feed, with a looper shaft, a looper supporting crank-arm adjustably mounted on the looper shaft, a looper adjustably mounted upon the free end of the crank-arm, and means for reciprocating and rocking the looper shaft, substantially as set forth.

26. In a sewing machine, the combination of a work-support, suitable feed mechanism and a needle and its operating mechanism, with a longitudinally reciprocating and rocking looper shaft having a looper attached thereto, a spline upon said looper shaft, a split collar engaging said splined portion of the looper shaft, bearings for the looper shaft and for said split collar, securing collars engaging the ends of said split collar upon opposite sides of its bearing, and means for reciprocating and rocking said looper shaft, substantially as set forth.

27. In a sewing machine, the combination of a work-support, suitable feed mechanism, and a needle and its operating mechanism, with a longitudinally movable rocking looper shaft carrying a looper, concentrically mounted rocking sleeve and shaft, the shaft being journaled within the sleeve, a suitable support for the sleeve, rock arms upon said rock shaft and rock sleeve suitably connected with the looper shaft for reciprocating and rocking it, and operating mechanisms for independently rocking said concentric shaft and sleeve, substantially as set forth.

28. In a sewing machine, the combination of a rigid work-support having a yielding ridge extending in the line of feed, a needle working across the ridge, a longitudinally reciprocating looper working across the line of the needle alongside of the ridge, means for actuating the needle and looper for coöperative action, and means for controlling the position of the work during its passage over the ridge.

29. In a sewing machine, the combination of a rigid work-support having a ridge extending in the line of feed, a needle working across the ridge, a longitudinally reciprocating looper working across the line of the needle alongside of the ridge, means for actuating the needle and looper for coöperative action, and means for causing the ridge to automatically vary its position according to the thickness of the work passing thereover.

30. In a sewing machine, the combination of a rigid work-support having a ridge extending in the line of feed, a needle working across the ridge, and a longitudinally reciprocating looper working across the line of the needle alongside of the ridge, means for actuating the needle and looper for coöperative action, and means for placing a limit upon the movement of the work toward the needle whereby, irrespective of the thickness of the work, the needle will penetrate the latter at a uniform distance from its top surface.

31. The combination of a rigid work-support; a yielding ridge carried by said support and extending in the line of feed; a needle working across the ridge; and a longitudinally reciprocating looper working across the line of the needle alongside of the ridge; said needle and looper being adjustable relatively, substantially as described.

32. In a sewing machine, the combination of a rigid work-support having a yielding ridge extending in the line of feed, a needle working across the ridge, a looper reciprocating across the line of the needle alongside of the ridge, and means for actuating the needle and looper to cause the same to form the stitch, substantially as described.

33. In a sewing machine, a rigid work-support having a yielding ridge and an adjacent work-supporting portion, an overhanging arm, stitch-forming mechanism supported by and movable relatively to said overhanging arm, the stitch-forming mechanism including a needle movable across the ridge and a longitudinally reciprocating looper arranged to work across the line of the needle and alongside the ridge.

34. The combination of yielding mechanism for creasing the work; rigid work-supporting means for carrying said creasing mechanism; and stitch-forming mechanism supported above the work-support and comprising two coöperating thread-manipulating elements, one to work across the crease for penetrating the work and the other to reciprocate beside the crease.

35. In a sewing machine, a yielding creasing mechanism for the work, rigid means carrying the creasing mechanism for supporting the free portion of the work, and presser-foot and stitching mechanism supported above the work, the stitching mechanism including two reciprocating thread-manipulating members, one movable through the crease and the other alongside of the crease.

36. In a sewing machine, a rigid work-support having a yielding ridge, an overhanging arm, a needle-carrying bar mounted on the end of said overhanging arm and arranged to reciprocate across the ridge of the work-support, a presser-foot mechanism carried by said overhanging arm and adapted to hold the work in place on the work-support, a looper mounted at the end of the overhanging arm and arranged to reciprocate alongside of said ridge, and means for actuating the needle and looper to cause them to manipulate the thread and make the stitch, substantially as described.

37. In a sewing machine, a rigid work-support having a ridge yieldingly mounted thereon, an overhanging arm, a needle mounted at the end of the overhanging arm and arranged to reciprocate across the ridge, a presser-foot mechanism carried by said overhanging arm, a looper mounted at the end of the overhanging arm and arranged to reciprocate alongside of said ridge, and means for actuating the needle and looper to manipulate the thread and produce the stitch, substantially as described.

38. In a sewing machine, a rigid work-support having a yielding ridge, an overhanging arm, a needle and a looper supported by said arm and reciprocating longitudinally, respectively, across and alongside said ridge, a presser-foot mechanism yieldingly supported and adapted to hold the work in place on the work-support, and means for actuating the needle and looper to manipulate the thread and form the stitch, substantially as described.

39. In a sewing machine, and in combination with a rigid work-support having a yielding ridge, a needle and a looper operating respectively across and parallel with the ridge, and mechanism for actuating said needle and looper to cause the same to have the movements stated and to manipulate the thread to form the stitch, substantially as described.

40. In a sewing machine, the combination of a rigid work-support having a yielding ridge-forming device, a feeding mechanism, a needle arranged to reciprocate horizontally and transversely to the line of feed, mechanism for operating said needle, a looper-rod provided with a looper located above the work-support and presser-foot and coöperating with said needle and the acting portion of which looper is eccentric to the longitudinal axis of said looper-rod, and mechanism for operating said looper-rod to cause the same to have a forward longitudinal movement to carry the looper forward above the work at one side of the line of stitches to take a loop from the needle above the work, then an axial or rocking movement to carry the looper across the line of stitches to the other side thereof, and then a longitudinal receding or rearward movement above the work to enable the looper to present the loop to the needle, and then a second axial or rocking movement to carry the looper again across the line of stitches to its first position, from which it may again move forward to take another loop, substantially as set forth.

41. In a sewing machine, a rigid work-support having a yielding ridge-forming device, a reciprocatory needle passing transversely to the path of the line of feed, feeding mechanism and means for actuating the needle and feeding mechanism, combined with the looper-rod, the looper eccentrically set with reference to the looper-rod and having a forwardly projecting portion, a prong and a finger each of which is provided with a shoulder, and means for moving the looper forward along one side of the line of sewing to take the loop from the needle, then axially across to the other side of the line of sewing, then rearwardly, and then across the line of sewing in rear of the needle to its first position, substantially as set forth.

42. In a sewing machine, a rigid work-support having a yielding ridge-forming device, a reciprocating needle passing transversely to the line of feed, a presser-foot, a feeding mechanism, and means for actuating the needle and feed mechanism, combined with the looper-rod, the looper carried by said rod and arranged above the work-support and presser-foot, said looper having the forwardly projecting portion, and means for moving the looper forward along one side of the line of sewing above the work to take the loop from the needle, then axially across to the other side of the line of sewing above the work, then rearwardly, and then across the line of sewing in rear of the needle to its first position, substantially as set forth.

43. In a sewing machine, the combination with the cloth-plate having a rigid work-support provided with a yielding ridge-forming device, of feeding mechanism, needle arranged to reciprocate above the cloth-plate transversely to the line of feed, a stationary bearing, a looper shaft mounted to oscillate in the bearing and also held by the latter to reciprocate in a fixed plane in parallelism to the cloth-plate, said shaft carrying at one end an eccentrically supported looper, and means for actuating the looper shaft to cause the looper to reciprocate in straight lines respectively on opposite sides of the line of stitching, and means for rocking the looper from one side to the other of the line of stitching.

In testimony whereof we have affixed our signatures, in presence of two witnesses.

HENRY H. FEFEL.
JOHN E. FEFEL.

Witnesses:
A. STETSON,
G. H. ADAMS.